United States Patent
Rune

(10) Patent No.: US 10,080,253 B2
(45) Date of Patent: Sep. 18, 2018

(54) METHODS AND APPARATUS FOR KEEP-ALIVE SIGNALING

(71) Applicant: Telefonaktiebolaget LM Ericsson (publ), Stockholm (SE)

(72) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/324,592

(22) PCT Filed: Jul. 9, 2014

(86) PCT No.: PCT/EP2014/064766
§ 371 (c)(1),
(2) Date: Jan. 6, 2017

(87) PCT Pub. No.: WO2016/004994
PCT Pub. Date: Jan. 14, 2016

(65) Prior Publication Data
US 2017/0202053 A1     Jul. 13, 2017

(51) Int. Cl.
*H04W 4/00*     (2018.01)
*H04W 76/28*     (2018.01)
(Continued)

(52) U.S. Cl.
CPC ....... *H04W 76/28* (2018.02); *H04W 72/0453* (2013.01); *H04W 74/0833* (2013.01); *H04W 76/25* (2018.02)

(58) Field of Classification Search
CPC ...... H04W 72/04; H04W 88/08; H04W 76/00
See application file for complete search history.

(56) References Cited

U.S. PATENT DOCUMENTS

2009/0116377 A1*   5/2009   Nylander .............. H04W 24/00
                                                                                                 370/216
2009/0316593 A1*   12/2009   Wang ................ H04W 74/0833
                                                                                                370/252
(Continued)

FOREIGN PATENT DOCUMENTS

WO     2009097602 A1     8/2009
WO     2010111820 A1     10/2010

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.1.0 (Dec. 2012), Dec. 2012, 1-57.

(Continued)

*Primary Examiner* — Siren Wei
(74) *Attorney, Agent, or Firm* — Sage Patent Group

(57) ABSTRACT

The present invention relates to a method for determining whether a wireless device is reachable in a cell served by a radio network node. The method is performed in the radio network node. The wireless device is in connected mode in the cell and applies DRX. The method comprises allocating (510) a dedicated random access preamble to the wireless device. The dedicated random access preamble is to be transmitted by the wireless device to indicate that the wireless device is reachable in the cell. The method further comprises transmitting (520) an indicator of the dedicated random access preamble to the wireless device, and monitoring (530) for the dedicated random access preamble from the wireless device. The method also comprises determining (540) that the wireless device is reachable when receiving the dedicated random access preamble from the wireless device.

30 Claims, 8 Drawing Sheets

(51) Int. Cl.
*H04W 76/25* (2018.01)
*H04W 74/08* (2009.01)
*H04W 72/04* (2009.01)

(56) References Cited

U.S. PATENT DOCUMENTS

| | | | | |
|---|---|---|---|---|
| 2010/0232363 | A1* | 9/2010 | Hsu | H04L 1/0079 370/328 |
| 2010/0309877 | A1* | 12/2010 | Damnjanovic | H04L 1/0029 370/331 |
| 2011/0013542 | A1 | 1/2011 | Yu et al. | |
| 2012/0113939 | A1* | 5/2012 | Kim | H04W 74/006 370/329 |
| 2012/0300655 | A1* | 11/2012 | Lee | H04W 24/00 370/252 |
| 2013/0195049 | A1* | 8/2013 | Yang | H04W 76/30 370/329 |
| 2013/0258882 | A1* | 10/2013 | Dinan | H04W 56/001 370/252 |
| 2013/0301591 | A1 | 11/2013 | Meyer et al. | |

OTHER PUBLICATIONS

ETSI, "Digital cellular telecommunications system (Phase 2+); Universal Mobile Telecommunications System (UMTS); LTE; Architecture enhancements to facilitate communications with packet data networks and applications (3GPP TS 23.682 version 11.3.0 Release 11)", ETSI TS 123 682 V11.3.0, Jan. 2013, 1-31.

ETSI, "LTE; Evolved Universal Terrestrial Radio Access (E-UTRA); Medium Access Control (MAC) protocol specification (3GPP TS 36.321 version 11.3.0 Release 11)", ETSI TS 136 321 V11.3.0, Jul. 2013, 1-59.

ETSI, "LTE; Evolved Universal Terrestrial Radio Access (E-UTRA); Physical channels and modulation (3GPP TS 36.211 version 11.4.0 Release 11)", ETSI TS 136 211 V11.4.0, Oct. 2013, 1-122.

ETSI, "LTE; Evolved Universal Terrestrial Radio Access (E-UTRA); Physical layer procedures (3GPP TS 36.213 version 11.0.0 Release 11)", ETSI TS 136 213 V11.0.0, Oct. 2012, 1-145.

* cited by examiner

METHODS AND APPARATUS FOR KEEP-ALIVE SIGNALING

TECHNICAL FIELD

The disclosure relates to keep-alive signaling, and more specifically to a radio network node and a wireless device, as well as to methods for determining whether the wireless device is reachable in a cell served by the radio network node, wherein the wireless device is in connected mode in the cell and applies discontinuous reception, DRX.

BACKGROUND

3GPP Long Term Evolution (LTE) is the fourth-generation mobile communication technologies standard developed within the 3$^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a User Equipment (UE) is wirelessly connected to a Radio Base Station (RBS) commonly referred to as an evolved NodeB (eNB or eNodeB) in LTE. A UE may more generally be referred to as a wireless device or a wireless terminal. An RBS is a general term for a radio network node capable of transmitting radio signals to the wireless device and receiving signals transmitted by the wireless device. The eNodeB is a logical node in LTE and the RBS is a typical example of a physical implementation of an eNodeB.

FIG. 1 illustrates a part of an LTE system. In the radio access network an eNodeB 101a serves a UE 103 located within the eNodeB's area of service or the cell 105a. The eNodeB 101a is connected via an X2 interface to a neighboring eNodeB 101b serving another cell 105b. The two eNodeBs 101a and 101b are connected to a core network node called Mobility Management Entity (MME). The core network in LTE is sometimes referred to as Evolved Packet Core (EPC), and the MME is one of the core network nodes in EPC. Together, the E-UTRAN, the EPC and potentially other entities too, such as service related entities, are referred to as the Evolved Packet System (EPS). S1 Application Protocol (AP) provides the signaling service between E-UTRAN and the EPC. The Non-Access Stratum (NAS) protocol is used for the control signaling between the UE and the MME.

In a current vision of the future development of the communication in cellular networks, huge numbers of mostly small autonomous wireless devices become increasingly important. Such autonomous wireless devices will typically, more or less infrequently—e.g. once per week to once per minute—transmit and receive only small amounts of data. These devices are assumed not to be associated with humans, but are rather sensors or actuators of different kinds, which communicate with application servers within or outside the cellular network. The application servers configure the devices and receive data from them. Hence, this type of communication is often referred to as machine-to-machine (M2M) communication and the devices may be denoted machine devices (MDs). In the 3GPP standardization the corresponding alternative terms are machine type communication (MTC) and MTC devices. The MTC devices are a subset of the more general term UE.

With the nature of MTC devices and their assumed typical usage follow that they will often have to be very energy efficient, since external power supplies will often not be available and since it is neither practically nor economically feasible to frequently replace or recharge their batteries. In some scenarios the MTC devices may not even be battery powered, but may instead rely on energy harvesting, i.e. gathering energy from the environment, and opportunistically utilizing the often very limited energy that may be tapped from e.g. sun light, temperature gradients, and vibrations.

A mechanism that has been introduced in 3GPP networks to conserve UE energy is Discontinuous Reception (DRX), which has been specified for both idle and connected mode. This mechanism allows a UE to spend most of the time in an energy efficient low power mode, often called sleep mode, while waking up to listen for certain downlink transmissions only on specific occasions. A UE applying DRX and being in idle mode—hereinafter referred to as idle mode DRX—wakes up to listen for pages, and a UE applying DRX and being in connected mode—hereinafter referred to as connected mode DRX—wakes up to listen for downlink resource assignments, i.e. downlink transmissions.

A DRX cycle essentially consists of a sleep period followed by an active period, although the occasions when the UE listens for pages in idle mode DRX are usually not referred to as active periods but rather as paging occasions. This DRX cycle is repeated over and over again until the wireless device is detached from the network, switches in either direction between idle mode and connected mode, or—for a device in connected mode DRX—is reconfigured. Typically, but not necessarily, the sleep period is longer than the active period. A DRX cycle may have a more complex structure than described above.

For connected mode DRX, for instance, the active period may end in a sequence of short cycles of sleep periods and active periods, but for the purpose of this disclosure the somewhat simplified view of a sleep period followed by an active period suffices. Chapter 5.7 of 3GPP TS 36.321 V11.3.0, "3rd Generation Partnership Project; Technical Specification Group Radio Access Network; Evolved Universal Terrestrial Radio Access (E-UTRA); Medium Access Control (MAC) protocol specification (Release 11)", June 2013, describes details of the connected mode DRX in LTE.

Currently the maximum DRX cycle length is 2.56 seconds, i.e. 256 radio frames of 10 milliseconds or 2560 subframes of 1 millisecond each, for both idle mode and connected mode DRX. However, in order to make the DRX mechanism even more effective for energy deprived MTC devices, 3GPP is working on extending the maximum DRX cycle length, and thus the sleep period, both for idle mode DRX and connected mode DRX, leveraging the delay tolerance and infrequent communication need of many MTC applications.

As the term Discontinuous Reception (DRX) implies, it concerns only the downlink, whereas a UE may initiate communication in the uplink at any time, irrespective of the DRX cycle.

The idle mode DRX cycle, i.e., the paging cycle, is configured in the UE through parameters in the system information (SI) that is broadcast in each cell, in combination with UE specific parameters. Alternatively, it is also possible to configure a UE specific paging cycle. The connected mode DRX cycle and other DRX parameters that may be used are configured in the UE through optional parameters. The parameters are typically provided in the RRCConnectionReconfiguration message of the Radio Resource Control (RRC)protocol, in conjunction with the idle to connected mode transition or at any other time when the UE is in connected mode.

A UE, e.g. an MTC device, applying extended connected mode DRX may lose its connection with the network, e.g. because it goes out of radio coverage or because its battery is discharged. Due to the long sleep periods and long periods without communication events, this may happen without the network detecting it. Consequently network resources and other resources in the RBS such as the eNodeB may be tied up in vain for extended periods of time.

SUMMARY

It is therefore an object to address at least some of the problems outlined above, and to provide a solution for continuous checks of reachability of wireless devices in connected mode DRX in order to avoid a waste of connection resources for non-reachable wireless devices, while limiting the power consumption in the wireless device. This object and others may be achieved by the methods and the apparatus according to the independent claims, and by the embodiments according to the dependent claims.

In accordance with a first aspect, a method for determining whether a wireless device is reachable in a cell served by a radio network node of a wireless communication system is provided. The method is performed in the radio network node. The wireless device is in connected mode in the cell and applies DRX. The method comprises allocating a dedicated random access preamble to the wireless device. The dedicated random access preamble is to be transmitted by the wireless device to indicate that the wireless device is reachable in the cell. The method further comprises transmitting an indicator of the dedicated random access preamble to the wireless device, and monitoring for the dedicated random access preamble from the wireless device. The method also comprises determining that the wireless device is reachable when receiving the dedicated random access preamble from the wireless device.

In accordance with a second aspect, a method for enabling a radio network node of a wireless communication system to determine that a wireless device is reachable in a cell served by the radio network node is provided. The method is performed in the wireless device being in connected mode in the cell and applying DRX. The method comprises receiving an indicator of a dedicated random access preamble from the radio network node, and transmitting the dedicated random access preamble to the radio network node to indicate that the wireless device is reachable in the cell.

In accordance with a third aspect, a radio network node of a wireless communication system is provided. The radio network node is configured to determine whether a wireless device is reachable in a cell served by the radio network node, when the wireless device is in connected mode in the cell and applies DRX. The radio network node is configured to allocate a dedicated random access preamble to the wireless device. The dedicated random access preamble is to be transmitted by the wireless device to indicate that the wireless device is reachable in the cell. The radio network node is further configured to transmit an indicator of the dedicated random access preamble to the wireless device, and monitor for the dedicated random access preamble from the wireless device. The radio network node is also configured to determine that the wireless device is reachable when receiving the dedicated random access preamble from the wireless device.

In accordance with a fourth aspect, a wireless device is provided. The wireless device is configured to enable a radio network node of a wireless communication system to determine that the wireless device is reachable in a cell served by the radio network node, when the wireless device is in connected mode in the cell and applies DRX. The wireless device is further configured to receive an indicator of a dedicated random access preamble from the radio network node, and transmit the dedicated random access preamble to the radio network node to indicate that the wireless device is reachable in the cell.

An advantage of embodiments is that the radio network node such as the RBS and the cellular network avoids tying up resources for a wireless device in extended connected mode DRX such as an MTC device when the wireless device is actually not reachable in the cell anymore.

Another advantage of embodiments is that the solution is energy efficient, in particular from the perspective of the wireless device.

Other objects, advantages and features of embodiments will be explained in the following detailed description when considered in conjunction with the accompanying drawings and claims.

DETAILED DESCRIPTION

Figure 1:
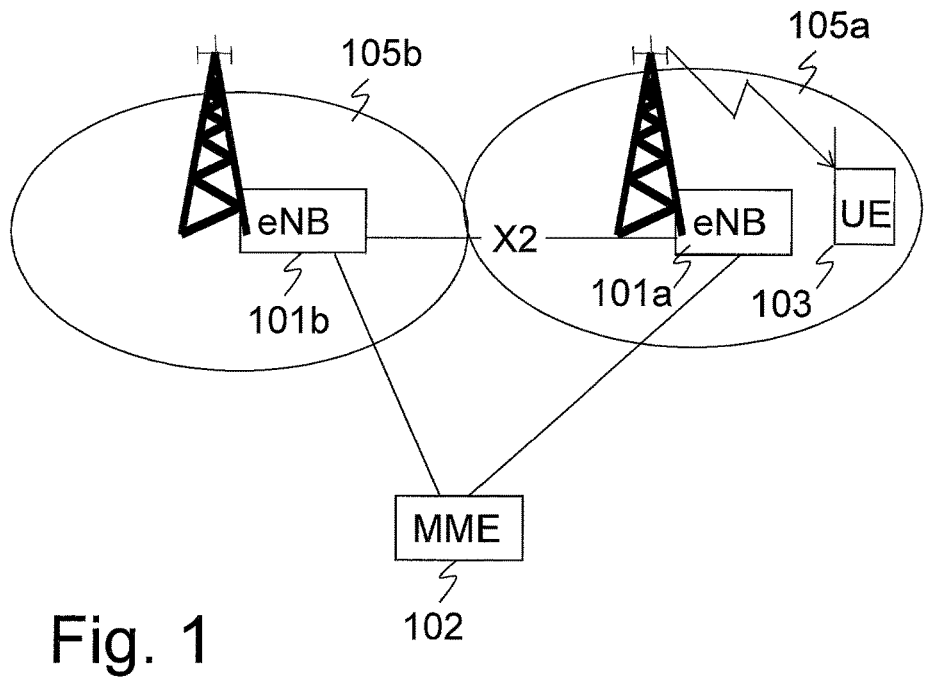
FIG. 1 is a schematic illustration of an LTE network.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Embodiments are described in a non-limiting general context in relation to an example scenario in an E-UTRAN, where a UE is in connected mode in a cell and applies DRX with an extended cycle, e.g. longer than 2.56 seconds. However, it should be noted that the embodiments may be applied to any radio access technology enabling the use of connected mode DRX, not limited to extended connected mode DRX, as well as to any kind of wireless device including, but not limited to, MD and MTC devices.

The problem of wireless devices in connected mode DRX that tie up resources in the network although they have lost their connection, is thus addressed by a solution where "keep-alive" signaling is used to enable the eNodeB to detect when a UE in extended connected mode DRX is no longer reachable in the cell. This keep-alive signaling may take the form of a signal repeatedly transmitted from the UE to the eNodeB with a maximum time interval in between subsequent signal transmissions, unless another transmission occurs from the UE.

A possible approach may be to reuse the keep-alive signaling used by UEs in idle mode, i.e. a periodic location registration, e.g. a periodic Tracking Area Update in EPS/LTE or a Periodic Location Update or a Periodic Routing Area Update in UMTS. However, from an energy efficiency perspective, which is the purpose of the extended connected mode DRX in the first place, this method may be inefficient, since the transmission of a Tracking Area Update Request NAS message from the UE requires a preceding scheduling request on the Physical Uplink Control Channel (PUCCH) or on the Physical Random Access Control Channel (PRACH) and may involve Hybrid Automatic Repeat Request (HARQ) retransmissions.

Another option may be to use a single PUCCH transmission from the UE. Possibly, a new PUCCH format would have to be introduced in LTE for this purpose, in order to enable the eNodeB to distinguish it from a scheduling request, unless an unused code point of PUCCH format 2 can be used. However, a UE in extended connected mode DRX will typically not be UL synchronized, i.e. it will not have a valid Timing Advance, and therefore the PUCCH transmission would have to be preceded by a Random Access (RA) procedure. In addition, having PUCCH resources allocated to potentially rather many, possibly even large numbers of MTC devices or UEs in extended connected mode DRX is resource inefficient.

Yet another possibility, at least in LTE, may be to utilize Sounding Reference Signal (SRS) transmissions from the UE. However, also SRS transmissions would have to be preceded by a RA procedure so that a UE without UL synchronization can retrieve a valid timing advance.

However, in embodiments of the invention a single RA transmission is used from the UE on the PRACH as the keep-alive signaling. Such a transmission consists of a RA preamble, which normally constitutes the first message or step of the RA procedure, which is further explained below. This single, short transmission is a very energy efficient way for the UE to inform the RBS of its continued presence and reachability in the cell. This keep-alive signaling may be repeatedly transmitted from the UE to the eNodeB with a maximum time interval in between subsequent signal transmissions, unless another transmission occurs from the UE. Optionally, the keep-alive signaling interval timer may be restarted whenever some other transmission from the UE occurs.

However, a RA preamble transmission used for the purpose of keep-alive signaling is not distinguishable from a regular RA preamble transmission and does not identify the UE making the RA preamble transmission. In addition, there is a risk of collision with a RA preamble transmission from another UE which happened to choose the same RA preamble and transmits using the same PRACH resource. These problems are overcome by allocating a dedicated RA preamble to a UE in extended connected mode DRX. Detecting this specific dedicated RA preamble on the PRACH will thereby inform the eNodeB that the concerned UE is still reachable, as the received dedicated RA preamble is understood as an indication from the UE of its continued presence in the cell. Dedicated RA preambles may sometimes be referred to as contention-free RA preambles. A dedicated RA preamble is not available for random selection by other UEs intending to perform a RA procedure, but uniquely identifies the UE to which it is allocated, as long as the allocation is valid. With regular usages according to the current standard, a dedicated RA preamble can only be used for one successful RA procedure by the UE to which it is allocated. However, in accordance with embodiments of the present invention, a UE that is allocated a dedicated RA preamble for the purpose of keep-alive signaling may use the dedicated RA preamble multiple times, and is expected to do so.

The conventional RA procedure consists of four messages sent between the UE and the eNodeB. In the first RA message the UE transmits a preamble on the Physical RA Channel (PRACH) to the eNodeB. Each cell has its own set of 64 RA preambles. However, preambles may be reused between non-neighbor cells. In the second RA message, the eNodeB sends a RA Response (RAR) to the UE using a broadcast identifier, i.e. a RA Radio Network Temporary Identifier (RA-RNTI). The message comprises among other parameters (see FIGS. 2 and 3) an Uplink (UL) grant, i.e. an UL transmission resource allocation for each RA preamble that the RAR is a response to. The UE transmits the third RA message to the eNodeB using the UL transmission resources allocated by the UL grant from the second message. When the RA procedure is a part of the procedure for transition of the UE between the RRC_IDLE and RRC_CONNECTED state, the third RA message comprises the RRC layer message RRCConnectionRequest, which includes a UE identity. The UE identity is used for contention resolution. To conclude the contention resolution, the eNodeB echoes the UE identity in the fourth RA message. The most elaborate of the RA messages is the second RA message, denoted RAR. The format of the MAC Packet Data Unit (PDU) for a RAR message is illustrated in FIG. 2, FIG. 3 illustrates the format of the MAC RAR of the MAC PDU of FIG. 2, and FIG. 4 illustrates the format of the UL grant in the MAC RAR of FIG. 3.

Figure 2:
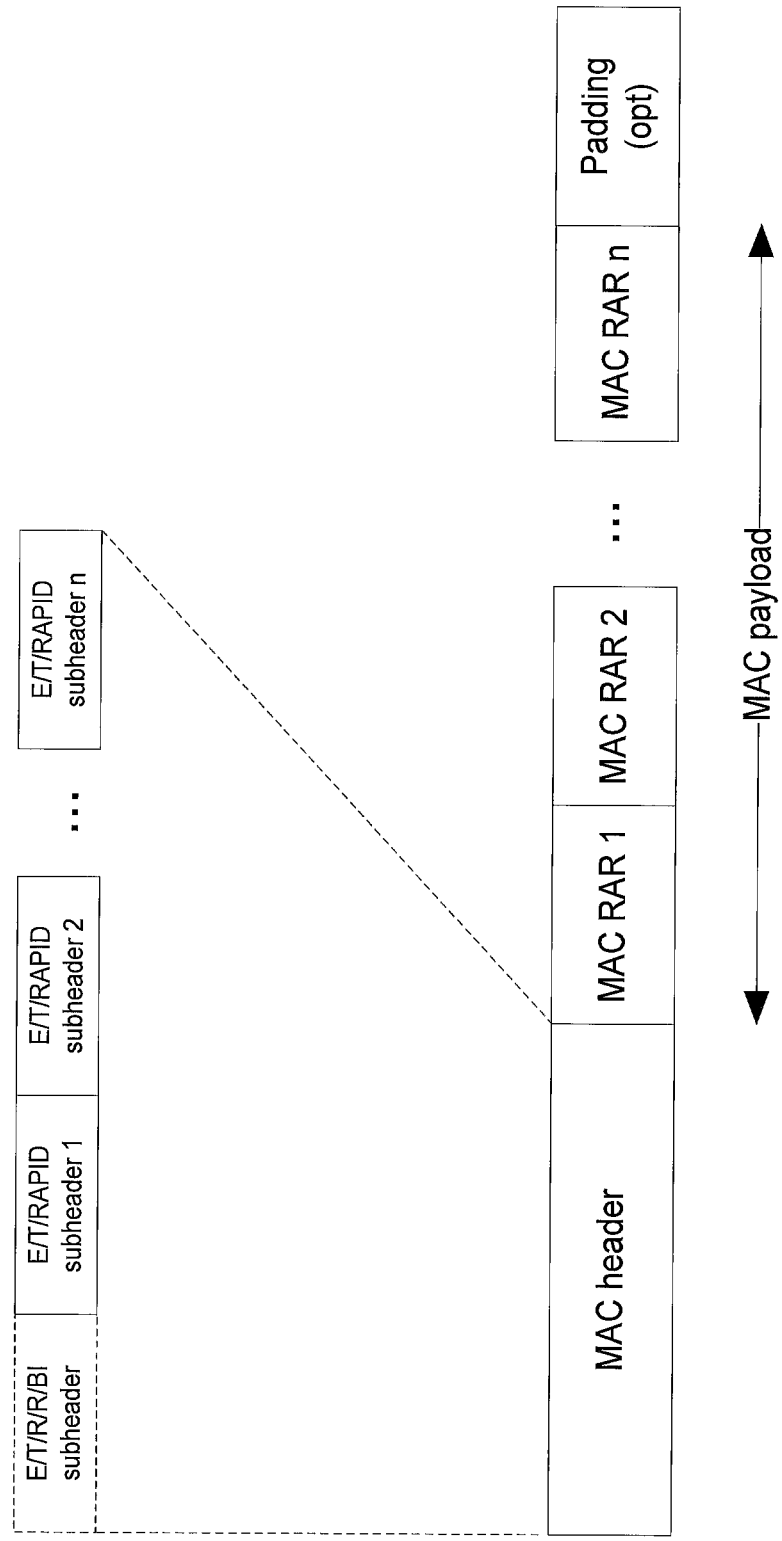
FIG. 2 is a block diagram schematically illustrating the format of the MAC PDU for a RAR according to prior art.

In FIG. 2, BI is the optional Backoff Indicator, RAPID is the RA Preamble Identity (ID) indicating the RA preamble transmission that the corresponding MAC RAR pertains to, E is the Extension flag indicating whether there are more subheaders in the MAC header, T is the Type flag indicating whether the subheader comprises a BI or a RAPID, the two R fields in the optional BI subheader are reserved bits set to zero by the sending eNodeB and ignored by the receiving UE, and MAC RAR comprises the actual response information to the UE.

Figure 3:
FIG. 3 is a block diagram schematically illustrating the format of a MAC RAR according to prior art.

FIG. 3 illustrates the format of the MAC RAR, according to 3GPP TS 36.321, V11.1.0, section 6.1.5. The MAC RAR consists of four fields: a reserved bit or field R, a Timing Advance Command, an UL Grant, and a Temporary Cell Radio Network Temporary Identifier (TC-RNTI). If the MAC RAR is sent in response to a RA preamble transmission using a dedicated RA preamble, the TC-RNTI may be replaced by the UE's already allocated regular C-RNTI, i.e. the C-RNTI of the UE to which the dedicated RA preamble has been allocated.

Figure 4:
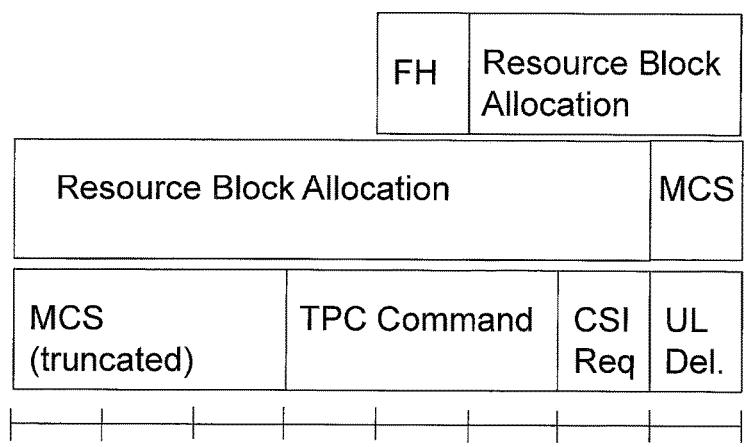
FIG. 4 is a block diagram schematically illustrating the format of an UL grant in a MAC RAR according to prior art.

FIG. 4 illustrates the LTE format of the UL grant in the MAC RAR as specified in 3GPP TS 36.213 V11.0.0. FH is a Frequency Hopping flag, which indicates whether frequency hopping should be used for the scheduled UL transmission. The Transmit Power Control (TPC) Command is a power control command for the scheduled UL transmission. In a non-contention based RA procedure the Channel Status Indicator (CSI) Request bit may be used to request a channel quality report in conjunction with the scheduled UL transmission, but in contention based RA the field is reserved, i.e. unused. The UL Delay bit indicates one of two possible delays between the RAR and the scheduled UL transmission.

As explained previously, a single transmission by the UE corresponding to the dedicated RA preamble transmission on the PRACH is used as the keep-alive signaling in embodiments of the invention. The single dedicated RA preamble transmission is all that it is needed to provide keep-alive signaling. No acknowledgement is necessary. However, although using unacknowledged dedicated RA preamble transmissions on the PRACH is enough, it may be preferable that the eNodeB acknowledges the reception of the dedicated RA preamble, i.e. the keep-alive signal, so that the UE knows that it will remain in connected mode from the perspective of the eNodeB.

There are at least two alternatives for the form of the acknowledgement:
1. A RAR message that unlike a regular RAR message in practice does not allocate any transmission resources to the UE.
2. A Physical Downlink Control Channel (PDCCH) or evolved PDCCH (ePDCCH) transmission addressed to the UE.

Acknowledgement alternative 1: A RAR message is a natural choice to provide acknowledgement of a RA preamble transmission. However, it would be wasteful to allocate transmission resources to a UE that only announces its reachability and thus does not request transmission resources. Therefore the RAR message, which normally includes an UL grant as described previously, may be slightly modified to remove or deactivate the UL grant when the RAR message is used to acknowledge the reception of a RA preamble allocated for the purpose of keep-alive signaling. The format of a regular RAR message in LTE is illustrated in FIG. 2, FIG. 3, and FIG. 4. Referring to LTE, one option may be to let it be implicitly understood that the transmission resources indicated in the UL grant should not be used. However, an explicit indication to the concerned UE that the RAR message serves as a confirmation of the keep-alive signaling is also conceivable and may be preferable. Such an explicit indication may be achieved in several ways:

One way is to not include any MAC RAR corresponding to a RAPID subheader that corresponds to a RA preamble that was used as a keep-alive signal. In order not to introduce ambiguities as to which MAC RAR a RAPID subheader pertains, the RAPID subheaders lacking corresponding MAC RARs should be placed last in the list of RAPID subheaders.

Another possibility is to keep the MAC RAR, but to set the field R (reserved) of the MAC RAR to 1 to indicate explicitly that it is a keep-alive signaling acknowledgement.

A dummy UL grant in the MAC RAR may serve as an explicit indication, e.g. using an incorrect UL grant format or a reserved or unused UL grant parameter combination. A suitable form of dummy UL grant could be to utilize the already existing way to "disable" or "deactivate" a transport block, i.e. a special combination of modulation and coding scheme (MCS) and number of resource blocks.

A MAC RAR without UL grant may also serve as an explicit indication. Similar to the above alternative with absent MAC RAR, and in order not to introduce ambiguities as to where a MAC RAR starts and stops, the RAPID subheaders pertaining to keep-alive signaling should be placed last in the list of RAPID subheaders.

Acknowledgement alternative 2: Although a RAR message may seem like a natural choice to provide acknowledgement of a RA preamble transmission, a transmission on the PDCCH (or ePDCCH) such as Downlink Control Information (DCI) may alternatively be used. The advantage of this alternative is that a transmission on the PDCCH requires fewer resources and is faster to receive and decode compared to the RAR message, thereby saving energy in the UE. The PDCCH transmission should be addressed to the UE's C-RNTI. If an ePDCCH transmission is used, it should use the UE specific Demodulation Reference Signal (DMRS). Since no other PDCCH (or ePDCCH) transmission is expected by the UE, it would not matter what the transmission of the control information contains. The UE would anyway understand that it is an acknowledgement of its keep-alive signal. However, this requires that the eNodeB does not have to send the acknowledgement when the UE is in a DRX active period, which in turn means that the UE must not transmit the keep-alive signal while it is in a DRX active period and in addition leave some margin before the next DRX active period so that the eNodeB has time to acknowledge the keep-alive signal before the DRX active period starts. This condition is thus required for this alternative embodiment to work. However, another possible embodiment is to introduce an explicit indication in the PDCCH (or ePDCCH) transmission to inform the UE that the transmission is a keep-alive signal acknowledgement. This explicit indication may e.g. be a single-bit flag. In another embodiment, the indication that the transmission is a keep-alive signal acknowledgement could be to address the transmission using a special RNTI and/or DMRS in case of ePDCCH. This special RNTI and/or DMRS may be allocated to the UE in conjunction with the allocation of the dedicated RA preamble.

According to the general principles of keep-alive signaling, the eNodeB keeps track of the time period during which no confirmation that the UE is reachable in the cell is received. A confirmation that the UE is reachable may be received either in the form of keep-alive signaling—i.e. in the form of a dedicated RA preamble—or as another regular transmission of either control or user data from the UE. If the eNodeB does not receive any such confirmation for a time period exceeding a certain maximum time period, e.g. equal to the maximum keep-alive signaling interval, the eNodeB assumes that the UE is no longer reachable in the cell and informs the MME accordingly. The MME may react to this by releasing the UE to idle mode. The release to idle mode includes requesting the eNodeB to release the RRC connection to the UE. Instead of considering the UE as unreachable after a time period equal to the maximum keep-alive signaling interval, the eNodeB may use an additional margin, e.g. equal to a small fraction of the maximum keep-alive signaling interval. Moreover, in order to allow failure to correctly receive one or even multiple keep-alive signals that were actually transmitted from the UE, the above mentioned maximum time period in the eNodeB may be set to expire after two or even more maximum keep-alive signaling intervals, and in both cases a small margin may be added to the multiple of maximum keep-alive signaling intervals.

Conventionally, there is a UE inactivity timer in the eNodeB. The length and exact usage of the UE inactivity timer is not standardized. With the proposed keep-alive signaling using dedicated RA preambles, the UE inactivity timer is essentially extended to or adapted to the maximum keep-alive signaling interval, optionally with an added margin. Alternatively the UE inactivity timer is deactivated and replaced by a keep-alive signaling timer according to embodiments of the invention.

Time Domain Sharing of Dedicated RA Preambles

Dedicated preambles are a scarce resource compared to the possibly rather large number of UEs that potentially simultaneously would be in extended connected mode DRX. As each UE in extended connected mode DRX would need a dedicated RA preamble for the keep-alive signaling, a way to overcome the issue of the limited availability of dedicated RA preambles is to use the fact that keep-alive signaling by nature is rather infrequent.

Hence, the same dedicated RA preamble may be shared by multiple UEs on a time-sharing basis. The dedicated RA preamble will still identify the UE that transmitted it, because the time that it was transmitted in accordance with the time-sharing schedule unambiguously indicates the concerned UE.

To use time-sharing of dedicated RA preambles, a UE that is allocated a dedicated RA preamble should, preferably in conjunction with the allocation and the configuration of the dedicated RA preamble, be informed of the time periods when it is allowed to use it. The UE may use the time-shared dedicated preamble for transmission on the PRACH in the PRACH opportunities within these allowed time periods. There are several different possibilities for configuration of PRACH opportunities in LTE according to the current 3GPP specifications as described in section 5.7.1 of 3GPP TS 36.211 V11.4.0. The sparsest configurations provide only one PRACH opportunity in every even radio frame of 10 ms, but there are also configurations with 1, 2, 3, 5 and 10 PRACH opportunities per radio frame of 10 ms in Frequency Division Duplex (FDD) mode. In Time Division Duplex (TDD) mode the PRACH opportunity configuration options allow a PRACH opportunity density of 0.5, 1, 2, 3, 4, 5 or 6 PRACH opportunities per 10 ms.

The allowed time periods, i.e. the time periods within which a UE is allowed to use its time-shared dedicated RA preamble, may be specified in several ways, as exemplified hereinafter:

1) In relation to the System Frame Number (SFN). The radio frames which constitute allowed time periods may be specified using any algorithm or formula, as further exemplified below in alternatives a) and b).
   a) The radio frames which constitute allowed time periods may be the ones satisfying the relation SFN modulo N+UeSpecificOffset=0, where SFN is the System Frame Number of the radio frame, N is the repetition interval of the allowed time periods, i.e. the allowed radio frames, expressed in number of radio frames and UeSpecificOffset is a UE specific offset that shifts the allowed time periods in time in a UE specific manner. The UeSpecificOffset may be calculated across SFN wrap-around when needed.
   b) The UE may be allowed to use the dedicated RA preamble in M consecutive radio frames, starting at every Nth radio frame (M≤N), where these starting frames may be specified e.g. as described in bullet 1) a) above.
2) In relation to radio frames and subframes. Any algorithm or formula may be used to specify the radio frames and subframes in which the UE is allowed to use the dedicated RA preamble, as further exemplified below in alternatives a) to d):
   a) The UE is allowed to use the dedicated RA preamble in the first X subframes of certain radio frames, where these radio frames may be specified e.g. as described in bullet 1) a) above.
   b) The UE is allowed to use the dedicated RA preamble in the last X subframes of certain radio frames, where these radio frames may be specified e.g. as described in bullet 1) a) above.
   c) The UE is allowed to use the dedicated RA preamble in the even subframes of certain radio frames, where these radio frames may be specified e.g. as described in bullet 1) a) above.
   d) The UE is allowed to use the dedicated RA preamble in subframes X, Y and Z of certain radio frames, where these radio frames may be specified e.g. as described in bullet 1) a) above.
3) In relation to the PRACH opportunities. Any algorithm or formula may be used to indicate the PRACH opportunities when a UE is allowed to use its time-shared dedicated RA preamble, as further exemplified below in alternatives a) and b):
   a) The UE is allowed to use the dedicated RA preamble every Nth PRACH opportunity, starting the PRACH opportunity counting at Tstart. Tstart could be specified in terms of SFN and subframe number or it could be implicitly defined as the time when the configuration of the allowed time periods occurs.
   b) The UE is allowed to use M consecutive PRACH opportunities, starting at every Nth PRACH opportunity (M≤N), starting the PRACH opportunity counting at Tstart. As above, Tstart could be specified in terms of SFN and subframe number or it could be implicitly defined as the time when the configuration of the allowed time periods occurs.

Note that irrespective of the durations of the allowed time periods, the time-shared dedicated RA preamble may only be transmitted using PRACH resources, i.e. on PRACH opportunities.

The time-sharing principle can be a very efficient way of utilizing the scarce dedicated RA preambles. In one example scenario, there is only one PRACH opportunity every second radio frame, thus corresponding to the most infrequent configuration. That gives 50 PRACH opportunities per second, which means that 3000 UEs sharing the same dedicated RA preamble could get a PRACH opportunity for keep-alive signaling once every minute. This shows that even a single time-shared dedicated RA preamble may scale rather far. In another example scenario, two dedicated RA preambles may be used. Configuring one PRACH opportunity every radio frame may then enable 12000 UEs to share one of the two dedicated RA preambles and still get a PRACH opportunity for keep-alive signaling every minute. Apparently the proposed time sharing scheme may scale very well to large numbers of UEs in extended connected mode DRX in the same cell.

Frequency Domain Sharing of Dedicated RA Preambles

For LTE the 3GPP specifications also allow PRACH multiplexing in the frequency domain. If this possibility is used, it may be used as a further or complementing way to share dedicated RA preambles between UEs. Thus, a UE that is allocated a shared dedicated RA preamble would be given the right to use it on a subset of the resource blocks, i.e. a subset of the subcarriers grouped in blocks of 12, allocated for PRACH transmissions in a certain subframe. This could optionally be combined with the restriction to use the shared dedicated RA preamble only during specific time periods and thus certain PRACH opportunities. The possibility to divide the usage of a shared dedicated RA preamble in both the time domain and the frequency domain improves the scaling properties of the scheme even further.

Configuration of Keep-Alive Signaling with Dedicated RA Preambles

There are different alternatives for how to actually configure a UE with a dedicated RA preamble and with the maximum keep-alive signaling interval, as well as with other possible associated configuration data such as the above described time and/or frequency domain sharing information.

A straightforward way of configuring the UE is to signal an indicator of the dedicated RA preamble such as the actual dedicated RA preamble or preferably a dedicated RA preamble index, and the associated information from the RBS to the UE in a dedicated RRC message. A dedicated RA preamble index indicates one of the 64 available preambles, and is typically used in control signaling in place of the actual preamble. A dedicated message means that the message is unicast to the UE. The dedicated message may be an RRCConnectionReconfiguration message. The indicator of the dedicated RA preamble may for instance be transmitted together with data associated with the extended connected mode DRX configuration, which thus may be conveyed to the UE in the same message. Another alternative may be to divide the information between broadcast system information and a dedicated RRC message, e.g. indicating the dedicated RA preamble in the system information and the rest of the information in a dedicated RRC message. In another alternative embodiment, information related to the keep-alive signaling interval, e.g. the maximum keep-alive signaling interval, may be sent in the system information and the rest of the information in a dedicated RRC message. In a further embodiment, both the indicator of the dedicated RA preamble and information related to the keep-alive signaling interval, e.g. the maximum keep-alive signaling interval, may be sent in the system information and the rest of the information, e.g. time-sharing information, may be sent in a dedicated RRC message. It may also be possible to indicate multiple dedicated RA preambles in the system information and sending an indication of which of the preambles to use, e.g. in the form of an index matching one of the preamble indices in the system information, together with other relevant information in a dedicated RRC message. In all of these alternatives the dedicated RRC message may be replaced by a MAC PDU with the concerned information contained in a MAC Control Element. The MAC PDU may be a stand-alone MAC PDU, i.e. not containing any higher layer message, or a MAC PDU carrying a higher layer message, such as an RRC message.

RA preambles are reused between cells, but typically not between neighbor cells. Hence, the dedicated RA preamble allocated to a UE must—at least typically—be replaced when the UE is handed over to another cell. Allocation of a new dedicated RA preamble together with any other relevant information, e.g. time-sharing information and/or maximum keep-alive signaling interval to be used in the new cell may be sent to the UE in a HANDOVER COMMAND-like message. The HANDOVER COMMAND-like message may e.g. be the message that triggers the UE to connect to the new cell, such as the RRCConnectionReconfiguration message in LTE. In this case the indicator of the dedicated RA preamble and its associated information would preferably be included in the MobilityControlInfo Information Element (IE) which contains configuration information to be used in the new cell. Optionally, in case the handover is an inter-eNodeB handover, the source eNodeB may indicate to the target eNodeB that a dedicated random access preamble was allocated to the UE in the source cell, e.g. along with other UE related data in the HANDOVER REQUEST X2AP message.

Redundancy for Keep-Alive Signaling Using Dedicated RA Preambles

A UE transmitting a keep-alive signal, i.e. the dedicated RA preamble allocated for this purpose as described above, cannot be certain that the serving eNodeB will successfully receive the keep-alive signal. If the eNodeB fails to receive the dedicated RA preamble when monitoring for it, the result may be that the eNodeB incorrectly considers the UE as unreachable in the cell.

Redundancy may be a way to overcome this issue. In one embodiment the eNodeB does not determine the UE to be unreachable in the cell until an amount n of maximum keep-alive signaling intervals have elapsed without the eNodeB having received the dedicated RA preamble from the UE. The amount n may be e.g. 2, 3 or 4.

In an alternative embodiment, the UE transmits several keep-alive signals in a burst, e.g. up to m keep-alive signals, where m may be e.g. 2, 3, 4, 5, 6, 8 or 10. If acknowledged keep-alive signals are used, then the UE may wait for acknowledgement after each keep-alive signal transmission, and transmit the next keep-alive signal in the burst only if no acknowledgement is received within a certain time window. If unacknowledged keep-alive signals are used, the UE may transmit the entire burst. When acknowledged keep-alive signals are used, a hybrid of these two approaches is also conceivable. With such a hybrid method the UE may transmit the keep-alive signals in the burst without waiting for acknowledgements in between, but as soon as an acknowledgement is received, pertaining to any of the so far transmitted keep-alive signals in the burst, the UE may stop transmitting and thus refrain from transmitting any remaining keep-alive signals in the burst.

When any of the above burst methods are used, the UE has to wake up from its DRX sleep mode somewhat earlier or with some margin when a maximum keep-alive signaling interval is about to expire, so that there is time to transmit an entire burst of keep-alive signals before the maximum keep-alive signaling interval expires.

If the above described time-sharing of dedicated RA preambles is used together with a burst method, then the PRACH opportunities when the UE is allowed to use the dedicated RA preamble should occur frequently enough to match the intended frequency of keep-alive signal transmissions within a burst. An alternative could be to use a more complex time-sharing scheme, allowing the UE to use the dedicated RA preamble in bursts. Groups of frequent PRACH opportunities may thus be allocated to a UE, thereby matching a burst transmission with longer intervals between the groups. Such a group of PRACH opportunities could e.g. be a number of PRACH opportunities within a single radio frame, provided that the density of configured PRACH opportunities is greater than one per radio frame. If a UE is allowed to use its time-shared dedicated RA preamble in all the PRACH opportunities of a certain radio frame, then a simple time-sharing configuration can be used, allowing the UE to use the time-shared dedicated RA preamble in every k:th radio frame, where k is an integer greater than 1. Otherwise, the time periods or PRACH opportunities in which a UE is allowed to use a time-shared dedicated RA preamble (which is intended to be used for RA preamble burst transmissions) may be defined e.g. as a number of consecutive radio frames or PRACH opportunities with longer time intervals between these groups of consecutive radio frames or PRACH opportunities. It may e.g. be in accordance with one of the above described algorithms 1) b) or 3) b). The groups of radio frames or PRACH opportunities would serve the purpose of matching the intended RA preamble burst transmissions. Alternatively, the allowed radio frames or PRACH opportunities in a group may not have to be consecutive, but could be interspaced by one or more non-allowed radio frames or PRACH opportunities. For instance the allowed radio frames or PRACH opportunities in a group could be distributed with one or two (or some other number) non-allowed radio frames or PRACH opportunities in between.

Methods

Figure 5A:
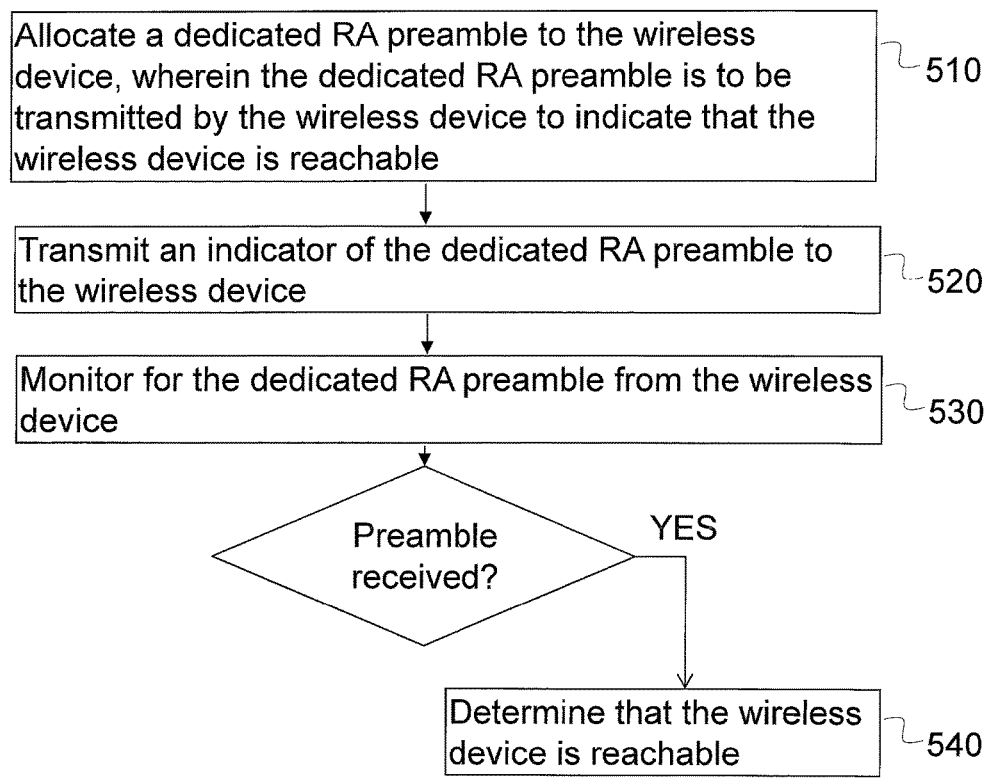
FIGS. 5a-b are flowcharts illustrating the method in a radio network node according to embodiments.

FIG. 5a is a flowchart illustrating an embodiment of a method performed in a radio network node 101 of a wireless communication system for determining whether a wireless device 103 is reachable in a cell served by the radio network node 101. The wireless device 103 is in connected mode in the cell and applies DRX. As in the example embodiments described previously, the wireless device 103 may be a UE, and the radio network node may be an eNodeB in E-UTRAN. The method comprises:

510: Allocating a dedicated RA preamble to the wireless device 103. The dedicated RA preamble is to be transmitted by the wireless device 103 to indicate that the wireless device 103 is reachable in the cell. The dedicated RA preamble is thus allocated to be used by the wireless device as a keep-alive signaling.

520: Transmitting an indicator of the dedicated RA preamble to the wireless device 103. The wireless device is thereby configured with the dedicated RA preamble to use for the keep-alive signaling. The indicator is typically transmitted in a dedicated RRC message, but may also be broadcasted in system information, as described previously in the section "Configuration of keep-alive signaling with dedicated RA preambles". The indicator may be the actual dedicated RA preamble or a dedicated RA preamble index.

530: Monitoring for the dedicated RA preamble from the wireless device 103. As described previously, the radio network node keeps track of the time period between transmissions from the wireless device to determine whether the wireless device is reachable or not.

540: Determining that the wireless device 103 is reachable when receiving the dedicated RA preamble from the wireless device 103. A received transmission of the dedicated RA preamble during the monitoring 530 confirms that the wireless device is reachable in the cell.

In embodiments, the dedicated RA preamble is allocated 510 for transmission by the wireless device during limited time intervals. The method may then further comprise transmitting information to the wireless device 103 indicating the limited time intervals. Additionally or alternatively, the dedicated RA preamble may be allocated for transmission by the wireless device in a subset of radio frequency resources of a RA occasion, or each repetitive RA occasion. The method may then further comprise transmitting information to the wireless device 103 indicating the subset of radio frequency resources. These embodiments have been further described in the sections "Time Domain Sharing of Dedicated RA Preambles" and "Frequency Domain Sharing of Dedicated RA Preambles" respectively.

Figure 5B:
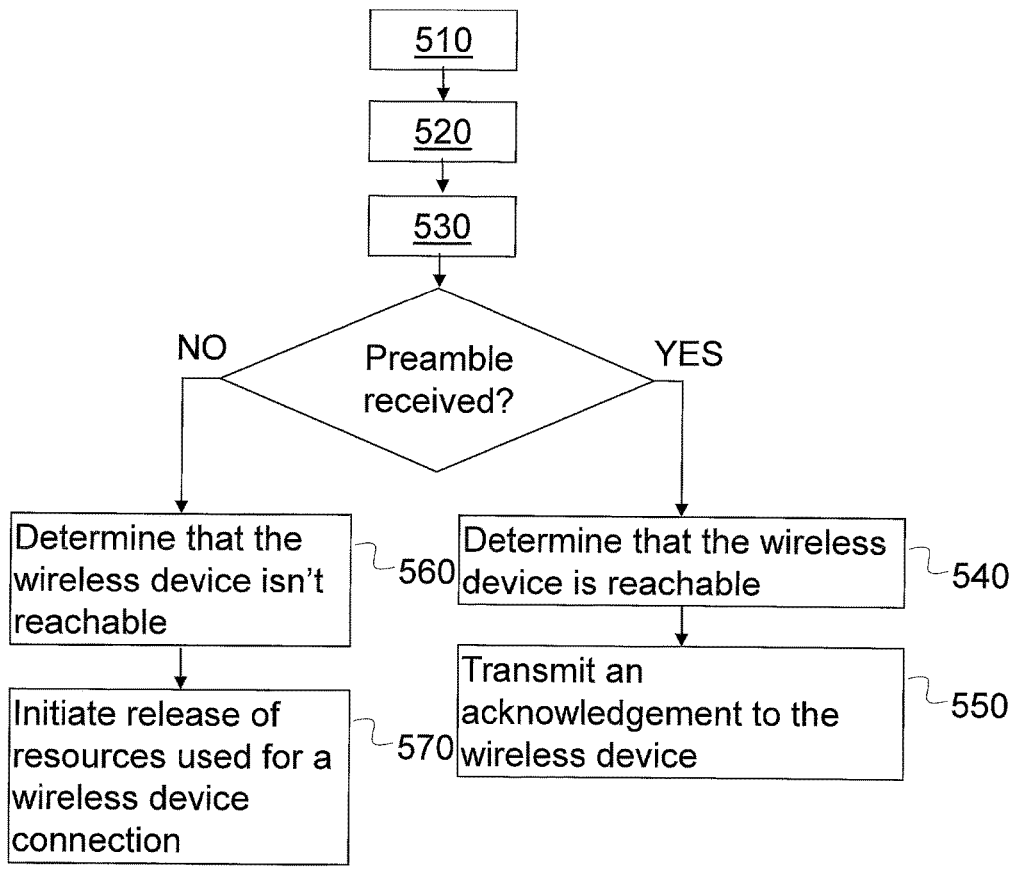

FIG. 5b is a flowchart illustrating another embodiment of the method in the radio network node 101. The method in the radio network node 101 may comprise in addition to the steps of allocating 510, transmitting 520, monitoring 530 and determining 540 described with reference to FIG. 5a:

550: Transmitting an acknowledgement to the wireless device 103 when receiving the dedicated RA preamble from the wireless device 103. An advantage of the acknowledgement of a keep-alive signaling from the wireless device is that it makes the wireless device aware of that it will remain in connected mode from the perspective of the radio network node. The acknowledgement may be a modified RA response message not carrying any valid uplink grant. Alternatively, the acknowledgement may be a control message dedicated to the wireless device 103. These embodiments are detailed above as Acknowledgement alternative 1 and Acknowledgement alternative 2 respectively.

Optionally, the method may also comprise the following when the dedicated RA preamble or other data than the dedicated RA preamble is not received from the wireless device 103 within a defined time period:

560: Determining that the wireless device 103 is not reachable. If the radio network node receives no keep-alive signaling from the wireless device in the form of the dedicated RA preamble allocated for this purpose during the monitoring 530 within a defined time period, and further does not receive any other data from the wireless device within the defined time period, the radio network node will conclude that the wireless device is unreachable.

Furthermore, the method may comprise when it is determined in 560 that the wireless device 103 is not reachable:

570: Initiating a release of resources used for a wireless device connection. In one embodiment, described above in relation to an E-UTRAN scenario where the radio network node is an eNodeB serving a UE, the eNodeB assumes that the UE is no longer reachable in the cell and initiates a release of resources used for the UE connection by informing the MME that the UE is perceived as unreachable. The MME may react to this by releasing the UE to idle mode. The release to idle mode includes requesting the eNodeB to release the RRC connection to the UE.

Figure 6A:
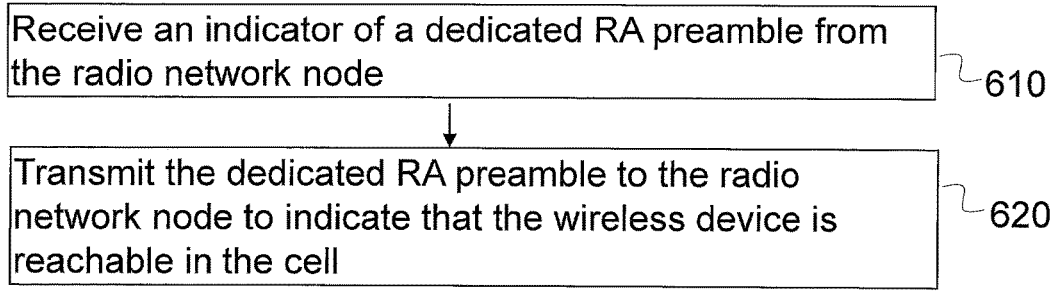
FIGS. 6a-b are flowcharts illustrating the method in a wireless device according to embodiments.

FIG. 6a is a flowchart illustrating an embodiment of a method for enabling a radio network node 101 of a wireless communication system to determine that a wireless device 103 is reachable in a cell served by the radio network node 101. The method is performed in the wireless device 103 being in connected mode in the cell and applying DRX. The wireless device 103 may be a UE, and the radio network node may be an eNodeB in E-UTRAN. The method comprises:

610: Receiving an indicator of a dedicated RA preamble from the radio network node 101.

620: Transmitting the dedicated RA preamble to the radio network node 101 to indicate that the wireless device 103 is reachable in the cell. The dedicated RA preamble may be transmitted repeatedly with an interval that is below a maximum time value. The dedicated RA preamble is thus transmitted as the keep-alive signaling by the wireless device. The advantage is that the RA preamble signaling is energy efficient and thus suitable for e.g. an MTC device. In addition, it is radio resource efficient, which is beneficial from an overall system efficiency perspective.

In embodiments of the invention, the method further comprises re-starting a timer for the interval at transmission of the dedicated RA preamble and at transmission of other data than the dedicated RA preamble. As explained previously, an ordinary data transmission from the wireless device is enough to let the radio network node know that the wireless device is reachable. Therefore, a transmission of other data than the dedicated RA preamble will also restart the timer.

Figure 6B:
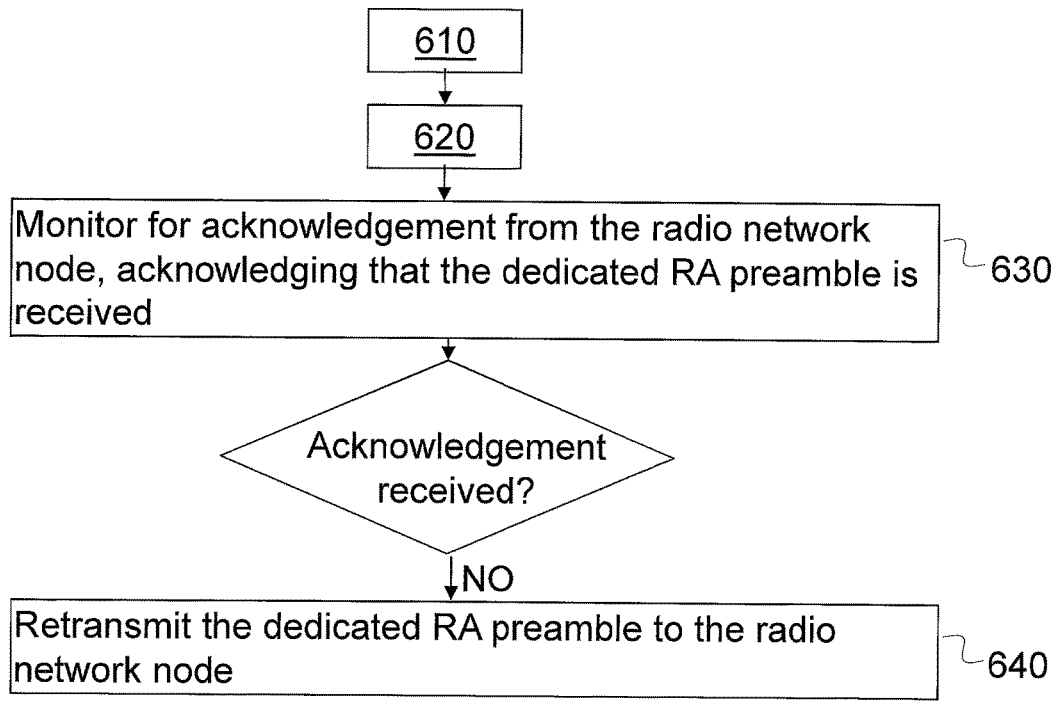

FIG. 6b is a flowchart illustrating another embodiment of the method in the wireless device, corresponding to the embodiment of the method performed in the radio network node described above with reference to FIG. 5b. The method may optionally comprise the following, in addition to the reception 610 of the indicator and the transmission of the dedicated RA preamble 620 described with reference to FIG. 6a:

630: Monitoring for an acknowledgement from the radio network node 101, acknowledging that the dedicated RA preamble is received by the radio network node 101. An advantage of the acknowledgement of a keep-alive signaling in the form of a dedicated RA preamble from the wireless device is that it makes the wireless device aware of that it will remain in connected mode from the perspective of the radio network node. The acknowledgement may be a modified RA response message not carrying any valid uplink grant. Alternatively, the acknowledgement may be a control message dedicated to the wireless device 103. These embodiments are detailed above as Acknowledgement alternative 1 and Acknowledgement alternative 2 respectively.

In one embodiment, the method may further comprise the following when no acknowledgement is received:

640: Retransmitting the dedicated RA preamble to the radio network node 101. This and other embodiments are further detailed in the section "Redundancy for Keep-Alive Signaling using Dedicated RA Preambles".

In embodiments, the method may further comprise at least one of the following:

Receiving information from the radio network node 101 indicating limited time intervals during which the wireless device is allowed to transmit the dedicated RA preamble. The dedicated RA preamble may then be transmitted 620 during the indicated limited time intervals.

Figure 7A:
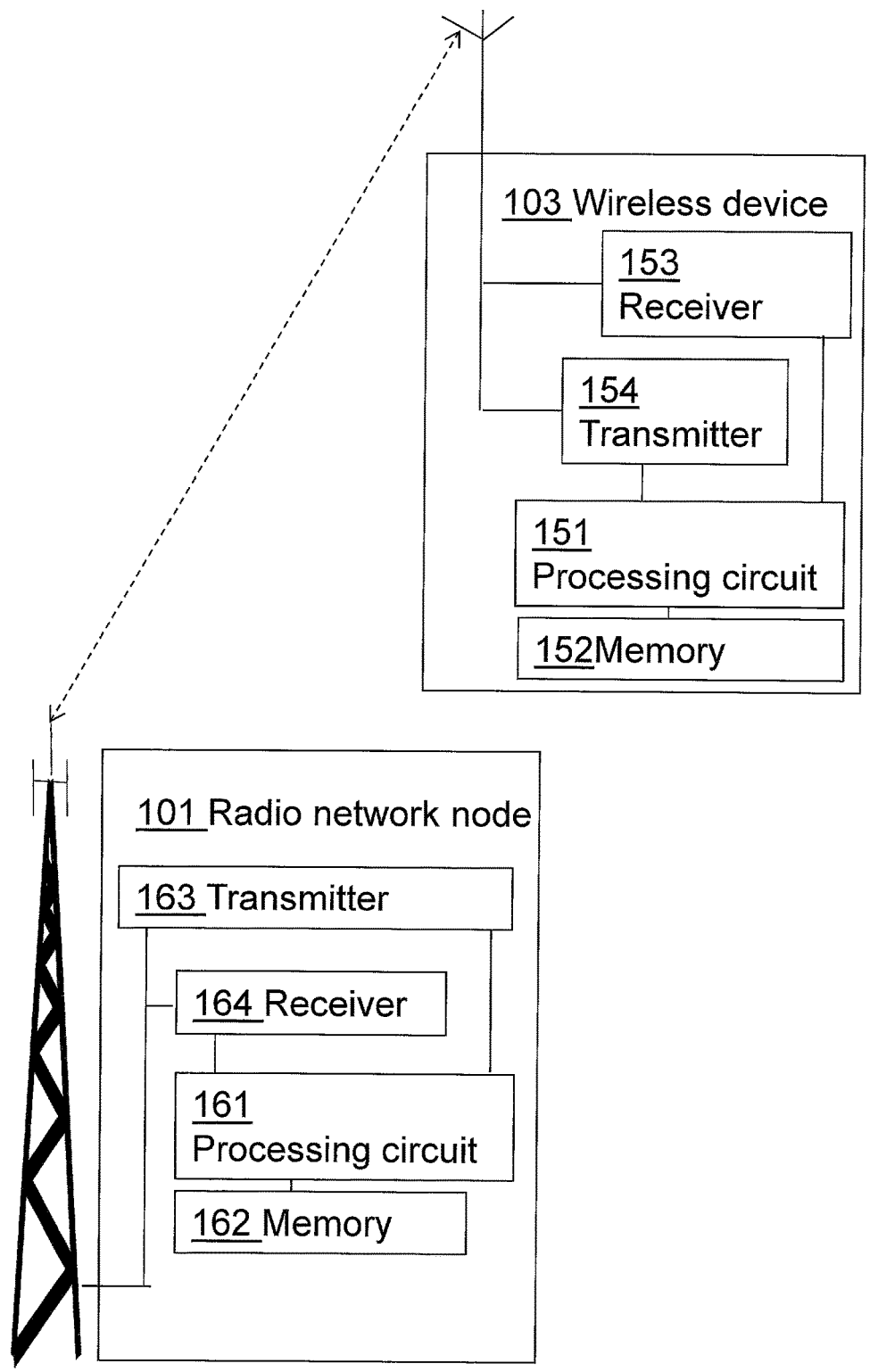
FIGS. 7a-b are block diagrams schematically illustrating a radio network node and a wireless device according to embodiments.

Receiving information from the radio network node 101 indicating a subset of radio frequency resources of a RA occasion, or each repetitive RA occasion, in which the wireless device is allowed to transmit the dedicated RA preamble, and wherein the dedicated RA preamble may then be transmitted 620 in the indicated subset of radio frequency resources Apparatus An embodiment of a radio network node 101 of a wireless communication system, and of a wireless device 103 is schematically illustrated in the block diagram in FIG. 7a.

The radio network node 101 of a wireless communication system is configured to determine whether a wireless device 103 is reachable in a cell served by the radio network node 101, when the wireless device 103 is in connected mode in the cell and applies DRX. The radio network node 101 is configured to allocate a dedicated RA preamble to the wireless device 103. The dedicated RA preamble is to be transmitted by the wireless device 103 to indicate that the wireless device 103 is reachable in the cell. The radio network node 101 is further configured to transmit an indicator of the dedicated RA preamble to the wireless device 103, and to monitor for the dedicated RA preamble from the wireless device 103. The radio network node 101 is also configured to determine that the wireless device 103 is reachable, when receiving the dedicated RA preamble from the wireless device 103.

In embodiments, the radio network node 101 may be further configured to transmit an acknowledgement to the wireless device 103 when receiving the dedicated RA preamble from the wireless device 103. The acknowledgement may be a modified RA response message not carrying any valid uplink grant, or it may be a control message dedicated to the wireless device 103. These embodiments are detailed above as Acknowledgement alternative 1 and Acknowledgement alternative 2 respectively.

The radio network node 101 may be further configured to determine that the wireless device 103 is not reachable, when the dedicated RA preamble or other data than the dedicated RA preamble is not received from the wireless device 103 within a defined time period. The radio network node 101 may be further configured to initiate a release of resources used for a wireless device connection when it is determined that the wireless device 103 is not reachable.

In embodiments, the dedicated RA preamble may be allocated for transmission by the wireless device during limited time intervals, and the radio network node 101 may be further configured to transmit information to the wireless device 103 indicating the limited time intervals. Additionally or optionally, the dedicated RA preamble may be allocated for transmission by the wireless device in a subset of radio frequency resources of a RA occasion, or each repetitive RA occasion, and the radio network node 101 may be further configured to transmit information to the wireless device 103 indicating the subset of radio frequency resources.

The wireless device 103 in FIG. 7a is configured to enable the radio network node 101 of the wireless communication system to determine that the wireless device 103 is reachable in a cell served by the radio network node 101, when the wireless device 103 is in connected mode in the cell and applies DRX. The wireless device is further configured to receive an indicator of a dedicated RA preamble from the radio network node 101, and transmit the dedicated RA preamble to the radio network node 101 to indicate that the wireless device 103 is reachable in the cell.

In embodiments, the wireless device 103 may be further configured to transmit the dedicated RA preamble repeatedly with an interval that is below a maximum time value. The wireless device 103 may be further configured to re-start a timer for the interval at transmission of the dedicated RA preamble and at transmission of other data than the dedicated RA preamble.

The wireless device 103 may be further configured to monitor for an acknowledgement from the radio network node 101, acknowledging that the dedicated RA preamble is received by the radio network node 101. The acknowledgement may be a modified RA response message not carrying any valid uplink grant, or it may be a control message dedicated to the wireless device 103. These embodiments are detailed above as Acknowledgement alternative 1 and Acknowledgement alternative 2 respectively.

The wireless device 103 may be further configured to retransmit the dedicated RA preamble to the radio network node 101 when no acknowledgement is received.

In embodiments, the wireless device 103 may be further configured to receive information from the radio network node 101 indicating limited time intervals during which the wireless device is allowed to transmit the dedicated RA preamble, and transmit the dedicated RA preamble during the indicated limited time intervals. Additionally or alternatively, the wireless device 103 may be further configured to receive information from the radio network node 101 indicating a subset of radio frequency resources of a RA occasion, or each repetitive RA occasion, in which the wireless device is allowed to transmit the dedicated RA preamble, and transmit the dedicated RA preamble in the indicated subset of radio frequency resources.

In an alternative way to describe the embodiments in FIG. 7a, the radio network node 101 comprises a transmitter 163, a receiver 164, a processing circuit 161 and a memory 162. The transmitter 163 and the receiver 164 may be connected to one or more antennas via one or more antenna ports. The memory 162 contains instructions executable by the processing circuit 161, whereby the radio network node 101 is operative to allocate a dedicated RA preamble to the wireless device 103. The dedicated RA preamble is to be transmitted by the wireless device 103 to indicate that the wireless device 103 is reachable in the cell. The radio network node 101 is further operative to transmit an indicator of the dedicated RA preamble via the transmitter 163 to the wireless device 103, and to monitor for the dedicated RA preamble from the wireless device 103. The radio network node 101 is also operative to determine that the wireless device 103 is reachable when receiving the dedicated RA preamble from the wireless device 103 via the receiver 164. The radio network node 101 may in embodiments be further operative to perform any of the methods described above with reference to FIGS. 5a-b.

Further, according to the alternative way to describe the embodiments in FIG. 7a, the wireless device 103 comprises a transmitter 154, a receiver 153, a processing circuit 151 and a memory 152. The memory 152 contains instructions executable by the processing circuit 151, whereby the wireless device 103 is operative to receive an indicator of a dedicated RA preamble from the radio network node 101 via the receiver 153, and to transmit the dedicated RA preamble via the transmitter 154 to the radio network node 101 to indicate that the wireless device 103 is reachable in the cell. The wireless device 103 may in embodiments be further operative to perform any of the methods described above with reference to FIGS. 6a-b.

It is to be noted that the term processing circuit used herein includes any hardware capable of executing instructions and/or program codes, e.g., a microprocessor such as a Central Processing Unit (CPU), a digital signal processor (DSP), or any other general-purpose or application specific processors. Furthermore, the term memory used herein includes any storage medium capable of storing instructions and/or program codes, e.g., a magnetic storage medium, an optical storage medium, a semiconductor storage medium and any other volatile or non-volatile storage mediums.

Figure 7B:
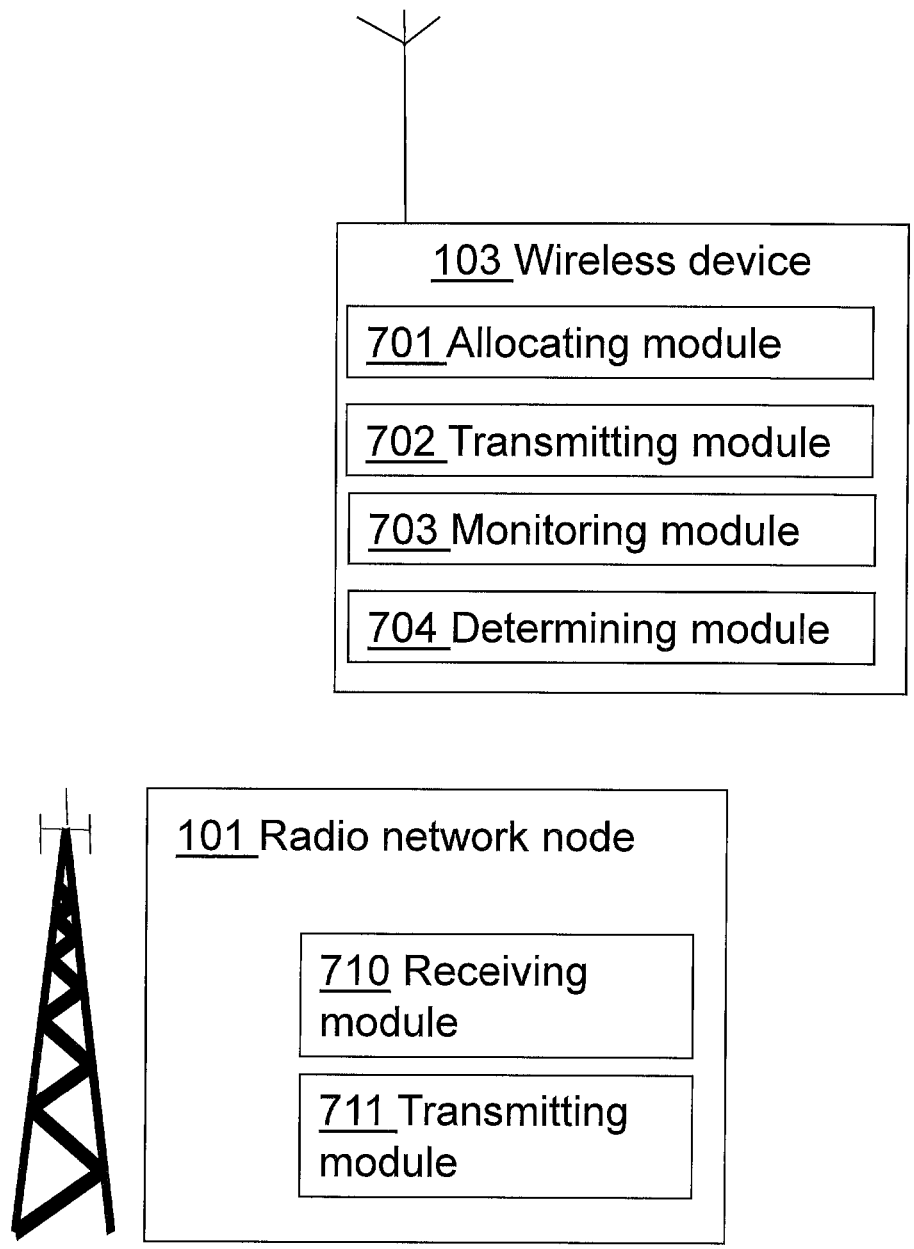

In still another alternative way to describe the embodiment in FIG. 7a, illustrated in FIG. 7b, the radio network node 101 comprises an allocating module 701 adapted to allocate a dedicated RA preamble to the wireless device 103. The radio network node 101 also comprises a transmitting module 702 adapted to transmit an indicator of the dedicated RA preamble to the wireless device 103, a monitoring module 703 adapted to monitor for the dedicated RA preamble from the wireless device 103, and a determining module 704 adapted to determine that the wireless device 103 is reachable when receiving the dedicated RA preamble from the wireless device 103.

The wireless device 103 comprises a receiving module 710 adapted to receive an indicator of a dedicated RA preamble from the radio network node 101. The wireless device 103 also comprises a transmitting module 720 adapted to transmit the dedicated RA preamble to the radio network node 101 to indicate that the wireless device 103 is reachable in the cell.

The modules described above with reference to FIG. 7b are functional units which may be implemented in hardware, software, firmware or any combination thereof. In one embodiment, the modules are implemented as a computer program running on a processor.

The radio network node 101 and the wireless device 103 may comprise a Central Processing Unit (CPU) each. The CPU may be a single unit or a plurality of units. Furthermore, the radio network node 101 and the wireless device 103 may comprise at least one computer program product (CPP) each in the form of a non-volatile memory, e.g. an EEPROM (Electrically Erasable Programmable Read-Only Memory), a flash memory or a disk drive. The CPP may comprise a computer program, which in turn comprises code means which when run on the radio network node 101 and the wireless device 103 respectively, causes the radio network node 101 and the wireless device 103 to perform steps of the methods described earlier in conjunction with FIGS. 5a-b, and 6a-b respectively.

In one aspect of the invention a first computer program is provided, comprising computer readable code which when run on the radio network node 101 causes the radio network node to perform a method as claimed in any of claims 1-7. Furthermore, a first computer program product is provided comprising a first computer readable medium and the first computer program. The first computer program is stored on the computer readable medium.

A second computer program is also provided, comprising computer readable code which when run on the wireless device 103 causes the wireless device to perform the method as claimed in any of claims 8-16. Furthermore, a second computer program product is provided, comprising a second computer readable medium and the second computer program. The second computer program is stored on the second computer readable medium.

The above mentioned and described embodiments are only given as examples and should not be limiting. Other solutions, uses, objectives, and functions within the scope of the accompanying patent claims may be possible.

Abbreviations
3GPP 3rd Generation Partnership Project
BI Backoff Indicator
C-RNTI Cell Radio Network Temporary Identifier
CSI Channel Status Information
DCI DL Control Information
DMRS Demodulation Reference Signal
DRX Discontinuous Reception
EPS Evolved Packet System
ePDCCH Enhanced PDCCH
E-UTRAN Evolved Universal Terrestrial Radio Access Network
FDD Frequency Division Duplex
IE Information Element
LTE Long Term Evolution
M2M Machine-to-Machine
MAC Medium Access Control
MD Machine Device
MME Mobility Management Entity
MTC Machine Type Communication
NAS Non-Access Stratum
PDCCH Physical Downlink Control Channel
PDU Packet Data Unit
PRACH Physical RA Channel
PUCCH Physical Uplink Control Channel
RA Random Access
RAPID RA Preamble ID
RAR RA Response RBS Radio Base Station
RNTI Radio Network Temporary Identifier
RRC Radio Resource Control
S1 The interface between the radio access network and the core network in EPS.
S1AP S1 Application Protocol (a protocol used between an eNodeB and an MME)
SFN System Frame Number
SRS Sounding Reference Signal
TDD Time Division Duplex
TPC Transmission Power Control
TS Technical Specification
UE User Equipment
UMTS Universal Mobile Telecommunications System
X2 The interface between two eNodeBs in LTE.

The invention claimed is:

1. A method performed in a radio network node of a wireless communication system for determining whether a wireless device is reachable in a cell served by the radio network node, wherein the wireless device is in connected mode in the cell and applies discontinuous reception (DRX), the method comprising:
allocating a dedicated random access preamble to the wireless device, wherein the dedicated random access preamble is to be transmitted by the wireless device to indicate that the wireless device is reachable in the cell;
transmitting an indicator of the dedicated random access preamble to the wireless device;
monitoring for the dedicated random access preamble from the wireless device;
determining that the wireless device is reachable responsive to receiving the dedicated random access preamble from the wireless device, wherein the dedicated random access preamble is received repeatedly with an interval that is below a maximum time value; and
re-starting a timer for the interval at receiving of the dedicated random access preamble and at receiving of data other than the dedicated random access preamble.

2. The method according to claim 1, further comprising:
transmitting an acknowledgement to the wireless device responsive to receiving the dedicated random access preamble from the wireless device.

3. The method according to claim 2, wherein the acknowledgement is a modified random access response message not carrying any valid uplink grant.

4. The method according to claim 2, wherein the acknowledgement is a control message dedicated to the wireless device.

5. The method according to claim 1, further comprising:
determining that the wireless device is not reachable when the dedicated random access preamble or data other than the dedicated random access preamble is not received from the wireless device within a defined time period; and
initiating a release of resources used for a wireless device connection when it is determined that the wireless device is not reachable.

6. The method according to claim 1, wherein the dedicated random access preamble is allocated for transmission by the wireless device during limited time intervals, the method further comprising:
transmitting information to the wireless device indicating the limited time intervals.

7. The method according to claim 1, wherein the dedicated random access preamble is allocated for transmission by the wireless device in a subset of radio frequency resources of a random access occasion, the method further comprising:
transmitting information to the wireless device indicating the subset of the radio frequency resources.

8. A method for enabling a radio network node of a wireless communication system to determine that a wireless device is reachable in a cell served by the radio network node, the method being performed in the wireless device, the wireless device being in connected mode in the cell and applying discontinuous reception (DRX), the method comprising:
receiving an indicator of a dedicated random access preamble from the radio network node;
transmitting the dedicated random access preamble to the radio network node to indicate that the wireless device is reachable in the cell, wherein the dedicated random access preamble is transmitted repeatedly with an interval that is below a maximum time value; and
re-starting a timer for the interval at transmission of the dedicated random access preamble and at transmission of data other than the dedicated random access preamble.

9. The method according to claim 8, further comprising:
monitoring for an acknowledgement from the radio network node, acknowledging that the dedicated random access preamble is received by the radio network node.

10. The method according to claim 9, wherein the acknowledgement is a modified random access response message not carrying any valid uplink grant.

11. The method according to claim 9, wherein the acknowledgement is a control message dedicated to the wireless device.

12. The method according to claim 9, further comprising when no acknowledgement is received:
retransmitting the dedicated random access preamble to the radio network node.

13. The method according to claim 8, further comprising:
receiving information from the radio network node indicating limited time intervals during which the wireless device is allowed to transmit the dedicated random access preamble, and wherein the dedicated random access preamble is transmitted during the indicated limited time intervals.

14. The method according to claim 8, further comprising:
receiving information from the radio network node indicating a subset of radio frequency resources of a random access occasion in which the wireless device is allowed to transmit the dedicated random access preamble, and wherein the dedicated random access preamble is transmitted in the indicated subset of the radio frequency resources.

15. A radio network node of a wireless communication system configured to determine whether a wireless device is reachable in a cell served by the radio network node, when the wireless device is in connected mode in the cell and applies discontinuous reception (DRX), the radio network node comprising:
communication circuitry configured for communicating with the wireless device; and
processing circuitry operatively associated with the communication circuitry and configured to:
allocate a dedicated random access preamble to the wireless device, wherein the dedicated random access preamble is to be transmitted by the wireless device to indicate that the wireless device is reachable in the cell;

transmit an indicator of the dedicated random access preamble to the wireless device;

monitor for the dedicated random access preamble from the wireless device;

determine that the wireless device is reachable responsive to receiving the dedicated random access preamble from the wireless device, wherein the received dedicated random access preamble has been transmitted repeatedly with an interval that is below a maximum time value; and re-start a timer for the interval of receiving of the dedicated random access preamble and receiving of data other than the dedicated random access preamble.

16. The radio network node according to claim 15, wherein the processing circuitry is configured to:

transmit an acknowledgement to the wireless device responsive to receiving the dedicated random access preamble from the wireless device.

17. The radio network node according to claim 16, wherein the acknowledgement is a modified random access response message not carrying any valid uplink grant.

18. The radio network node according to claim 16, wherein the acknowledgement is a control message dedicated to the wireless device.

19. The radio network node according to claim 15, wherein the processing circuitry is configured to:

determine that the wireless device is not reachable when the dedicated random access preamble or data other than the dedicated random access preamble is not received from the wireless device within a defined time period; and initiate a release of resources used for a wireless device connection when it is determined that the wireless device is not reachable.

20. The radio network node according to claim 15, wherein the dedicated random access preamble is allocated for transmission by the wireless device during limited time intervals, and wherein the processing circuitry is configured to:

transmit information to the wireless device indicating the limited time intervals.

21. The radio network node according to claim 15, wherein the dedicated random access preamble is allocated for transmission by the wireless device in a subset of radio frequency resources of a random access occasion, and wherein the processing circuitry is configured to:

transmit information to the wireless device indicating the subset of the radio frequency resources.

22. A wireless device configured to enable a radio network node of a wireless communication system to determine that the wireless device is reachable in a cell served by the radio network node, when the wireless device is in connected mode in the cell and applies discontinuous reception (DRX), the wireless device comprising:

communication circuitry configured for communications with the radio network node; and processing circuitry operatively associated with the communication circuitry and configured to:

receive an indicator of a dedicated random access preamble from the radio network node;

transmit the dedicated random access preamble to the radio network node to indicate that the wireless device is reachable in the cell;

wherein the processing circuitry is configured to transmit the dedicated random access preamble repeatedly with an interval that is below a maximum time value; and re-start a timer for the interval at transmission of the dedicated random access preamble and at transmission of data other than the dedicated random access preamble.

23. The wireless device according to claim 22, wherein the processing circuitry is configured to:

monitor for an acknowledgement from the radio network node, acknowledging that the dedicated random access preamble is received by the radio network node.

24. The wireless device according to claim 23, wherein the acknowledgement is a modified random access response message not carrying any valid uplink grant.

25. The wireless device according to claim 23, wherein the acknowledgement is a control message dedicated to the wireless device.

26. The wireless device according to claim 23, wherein the processing circuitry is configured to:

retransmit the dedicated random access preamble to the radio network node when no acknowledgement is received.

27. The wireless device according to claim 22, wherein the processing circuitry is configured to:

receive information from the radio network node indicating limited time intervals during which the wireless device is allowed to transmit the dedicated random access preamble; and transmit the dedicated random access preamble during the indicated limited time intervals.

28. The wireless device according to claim 22, wherein the processing circuitry is configured to:

receive information from the radio network node indicating a subset of radio frequency resources of a random access occasion in which the wireless device is allowed to transmit the dedicated random access preamble; and transmit the dedicated random access preamble in the indicated subset of the radio frequency resources.

29. A non-transitory computer readable storage medium storing a computer program for determining whether a wireless device is reachable in a cell served by a radio network node, wherein the wireless device is in connected mode in the cell and applies discontinuous reception (DRX), the computer program comprising computer readable code that, when executed on processing circuitry of the radio network node, causes the radio network node to:

allocate a dedicated random access preamble to the wireless device, wherein the dedicated random access preamble is to be transmitted by the wireless device to indicate that the wireless device is reachable in the cell;

transmit an indicator of the dedicated random access preamble to the wireless device;

monitor for the dedicated random access preamble from the wireless device;

determine that the wireless device is reachable when receiving the dedicated random access preamble from the wireless device, wherein the dedicated random access preamble is received repeatedly with an interval that is below a maximum time value; and re-start a timer for the interval at receiving of the dedicated random access preamble and at receiving of data other than the dedicated random access preamble.

30. A non-transitory computer readable storage medium storing a computer program for enabling a radio network node of a wireless communication system to determine that a wireless device is reachable in a cell served by the radio network node, the wireless device being in connected mode in the cell and applying discontinuous reception (DRX), the computer program comprising computer readable code that, when executed on processing circuitry of the wireless device, causes the wireless device to:
- receive an indicator of a dedicated random access preamble from the radio network node;
- transmit the dedicated random access preamble to the radio network node to indicate that the wireless device is reachable in the cell, wherein the dedicated random access preamble is transmitted repeatedly with an interval that is below a maximum time value; and
- re-start a timer for the interval at transmission of the dedicated random access preamble and at transmission of data other than the dedicated random access preamble.

\* \* \* \* \*